No. 874,717.  
PATENTED DEC. 24, 1907.
J. WINKELMEYER.  
COMPUTING CHEESE CUTTER FOR VENDING CHEESE.  
APPLICATION FILED JULY 5, 1907.
4 SHEETS—SHEET 1.
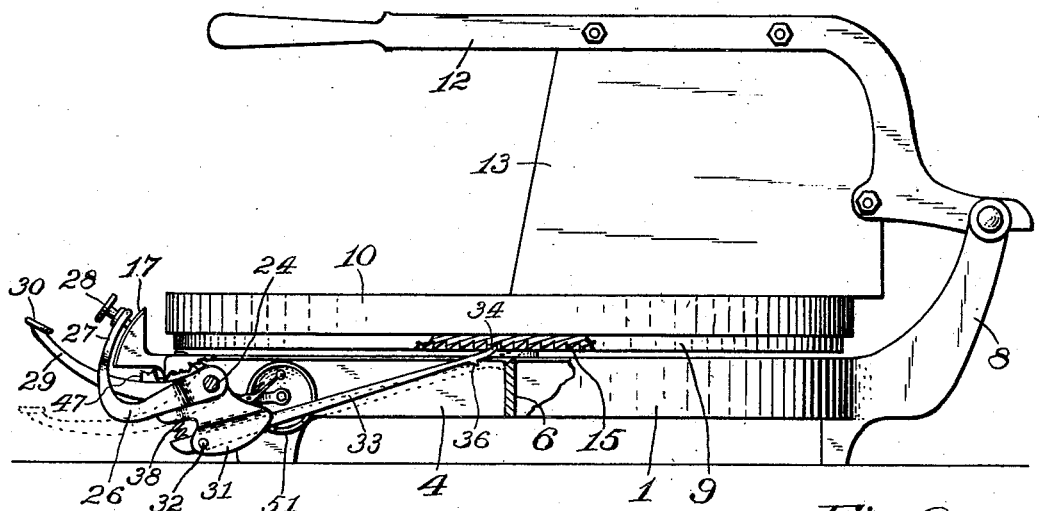
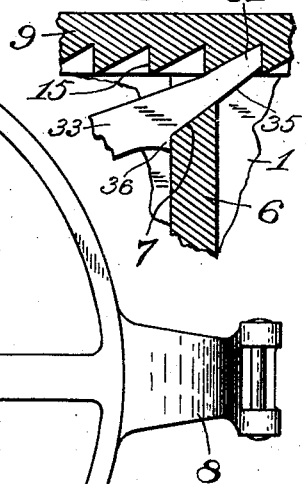
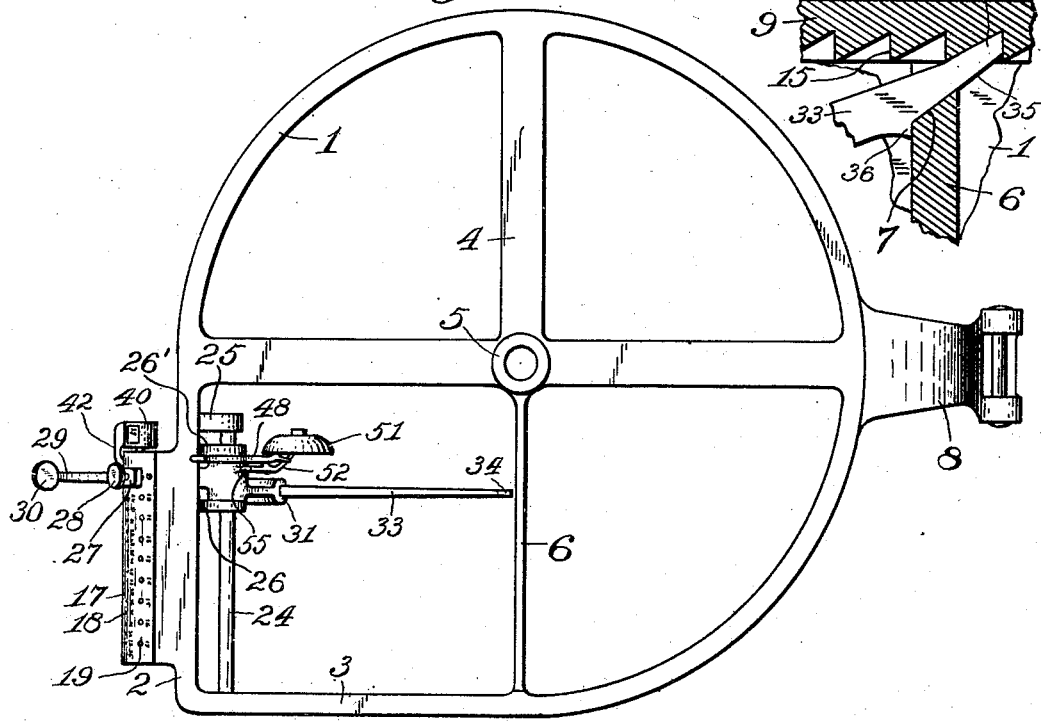
WITNESSES:  
J. H. Gardner.  
M. D. Beaty.
INVENTOR:  
John Winkelmeyer,  
BY  
E. T. Silvius,  
ATTORNEY.

No. 874,717. PATENTED DEC. 24, 1907.
J. WINKELMEYER.
COMPUTING CHEESE CUTTER FOR VENDING CHEESE.
APPLICATION FILED JULY 5, 1907.
4 SHEETS—SHEET 2.
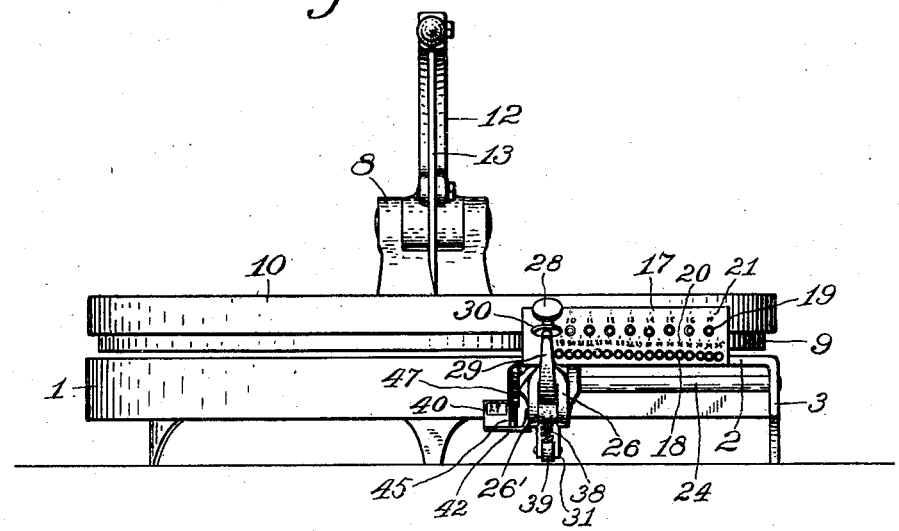
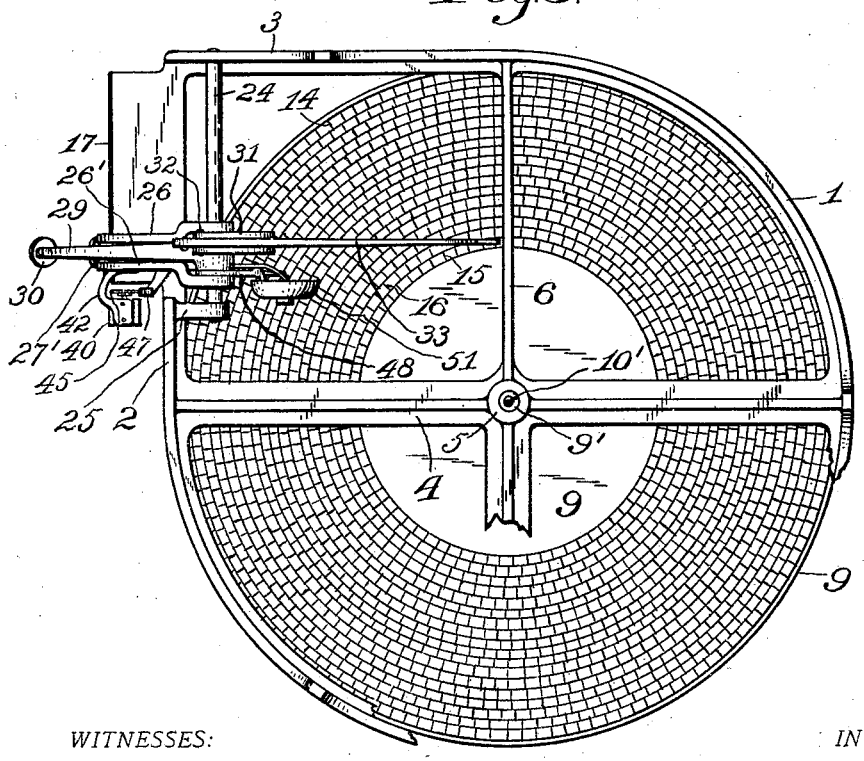
WITNESSES:
J. H. Gardner
M. D. Beaty
INVENTOR:
John Winkelmeyer,
BY E. T. Silvius,
ATTORNEY.

No. 874,717. PATENTED DEC. 24, 1907.
J. WINKELMEYER.
COMPUTING CHEESE CUTTER FOR VENDING CHEESE.
APPLICATION FILED JULY 5, 1907.
4 SHEETS—SHEET 3.
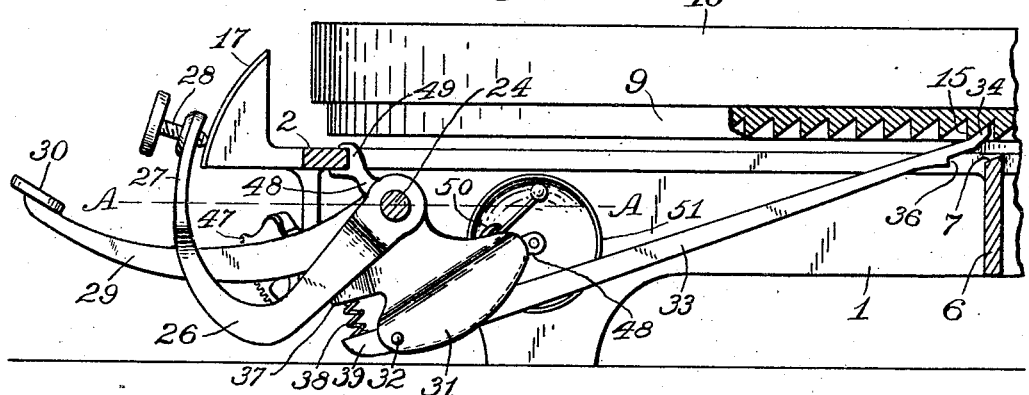
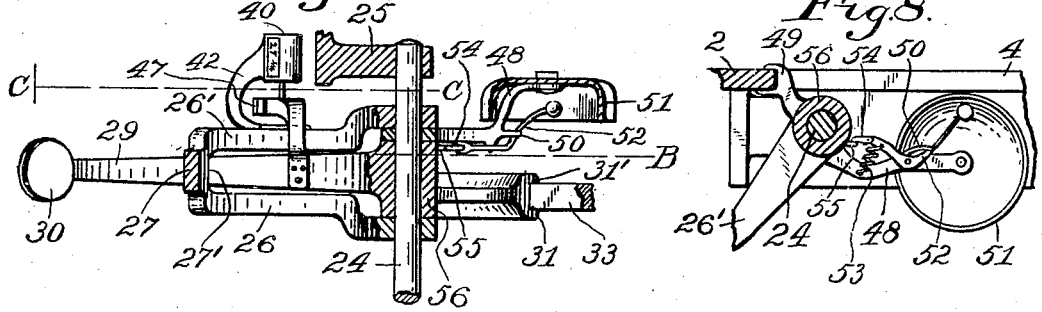
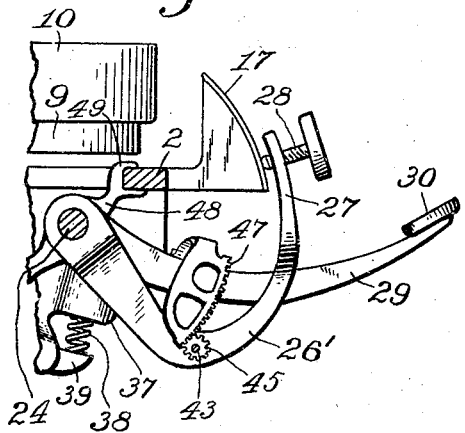
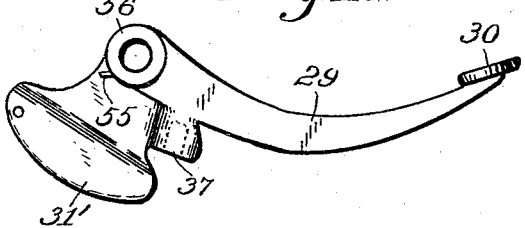
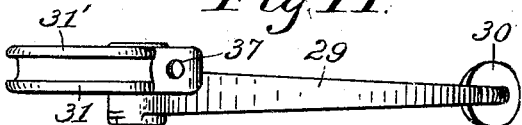
WITNESSES:
J. H. Gardner.
M. D. Beaty.
INVENTOR:
John Winkelmeyer,
BY E. T. Silvius,
ATTORNEY.
THE NORRIS PETERS CO., WASHINGTON, D. C.

No. 874,717. PATENTED DEC. 24, 1907.
J. WINKELMEYER.
COMPUTING CHEESE CUTTER FOR VENDING CHEESE.
APPLICATION FILED JULY 5, 1907.
4 SHEETS—SHEET 4.
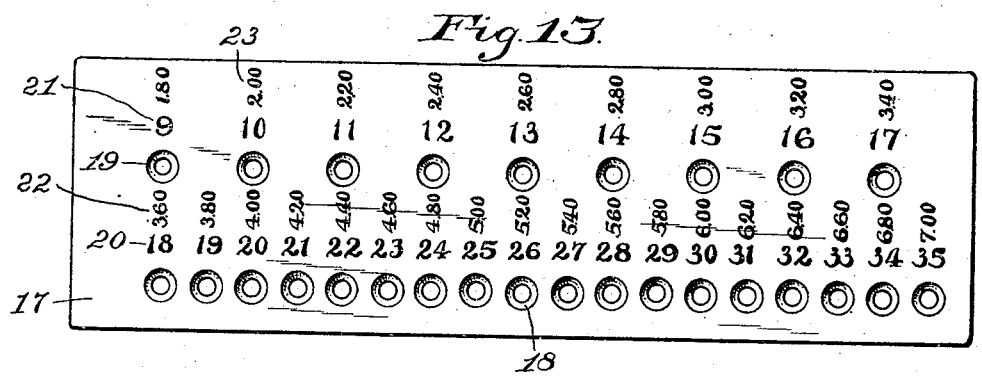
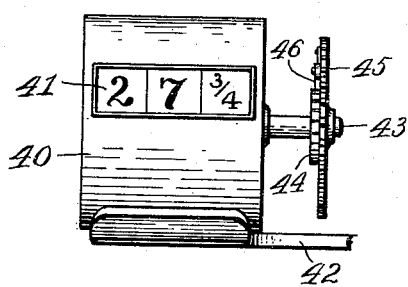
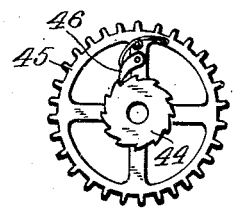
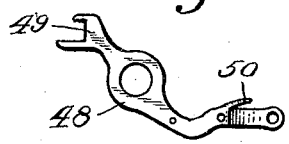
WITNESSES:
J. H. Gardner
M. D. Beaty
INVENTOR
John Winkelmeyer,
BY
E. T. Silvius,
ATTORNEY.

UNITED STATES PATENT OFFICE.

JOHN WINKELMEYER, OF ANDERSON, INDIANA, ASSIGNOR OF ONE-HALF TO THOMAS S. GETTLE AND ONE-HALF TO ALFRED L. REED, BOTH OF ANDERSON, INDIANA.

COMPUTING CHEESE-CUTTER FOR VENDING CHEESE.

No. 874,717.  Specification of Letters Patent.  Patented Dec. 24, 1907.

Application filed July 5, 1907. Serial No. 382,207.

*To all whom it may concern:*

Be it known that I, JOHN WINKELMEYER, a citizen of the United States, residing at Anderson, in the county of Madison and State of Indiana, have invented certain new and useful Improvements in Computing Cheese-Cutters for Vending Cheese; and I do declare the following to be a full, clear, and exact description of the invention, reference being had to the accompanying drawings, and to the letters and figures of reference marked thereon, which form a part of this specification.

This invention relates to the class of cheese cutters which are designed for dividing any of the usual sizes of cylindrical or circular cheeses into portions of various sizes proportioned to the whole, and cutting off the portions to form slices for vending the cheese in relatively small quantities, and the invention has reference particularly to computing cheese cutters which are provided with positive operating mechanism for spacing off the desired portions of the cheese accurately, a register for indicating the amounts of the cheese cut, and a bell or gong for announcing when cuts are made.

Objects of the invention are, first, to provide an improved and simplified computing cheese cutter for vending purposes which will be adapted to be instantly and accurately adjusted so as to divide cheeses of different total values or weights, and which will be adapted to operate positively to divide a cheese into a predetermined number of equal portions or definite multiples thereof, without liability to cause uncontrollable variations incidental to wear and lost motion of the operating mechanism; second, to provide a computing cheese cutter in which all the operating devices that require handling may be conveniently arranged for the operator; third, to provide registering apparatus for cheese cutters whereby the amounts of cheese cut may be indicated; and, fourth, to provide an alarm bell for cheese cutters whereby unauthorized use of the cutter may be detected.

The invention consists in an improved computing cheese divider and cutter comprising a frame, a rotary table for supporting and rotatively carrying the cheese, provided with a plurality or series of concentric circles or circular series of teeth, each circle having a multiplicity of the teeth therein, all the teeth provided being spaced equidistantly apart, the larger circles having each a greater number of teeth than the smaller circles; a movable controlling-bar which coöperates with the teeth and serve to move the table, to stop the table accurately and control its position, and to lock the table temporarily if desired while cutting the cheese; an abutment with which the controlling-bar coöperates; an operating device for the controlling-bar, means for adjustably limiting the movement of the controlling-bar, a computed indicator for gaging the controlling-bar with respect to the several circular series of teeth to adapt the machine for dividing any one of the various sizes of cheeses; means for maintaining the relation of the controlling-bar to the circles of teeth; an automatic register to indicate the quantities of cheese cut; and, an automatic tell-tale bell to announce the movement of the cheese table.

The invention consists further in the novel elements of construction embodied in the improved machine, and in the combinations and arrangements of elements, as hereinafter particularly described and defined in the appended claims.

Referring to the drawings Figure 1 is a side elevation of a machine constructed substantially in accordance with the invention, a portion of the frame being broken away to expose operating mechanism; Fig. 2, a fragmentary detail of parts of the machine; Fig. 3, a top plan view of the frame and parts of the operating mechanism of the machine, the cheese table being omitted; Fig. 4, a front elevation of the machine; Fig. 5, an inverted plan view in which a portion of the frame is broken away; Fig. 6, a fragmentary side elevation partially in section; Fig. 7, a fragmentary sectional detail view approximately on the line A A in Fig. 6; Fig. 8, a fragmentary sectional detail view approximately on the line B in Fig. 7; Fig. 9, a fragmentary sectional detail view approximately on the line C C in Fig. 7; Fig. 10, a side elevation of the operating lever; Fig. 11, an inverted plan view of the operating lever; Fig. 12, a fragmentary sectional detail view showing the central portion of the cheese table; Fig. 13, a front or plan view of the computed indicator; Fig. 14, a top plan view of the register; Fig. 15, a side elevation of the gearing for operating the register; and, Fig. 16, a side elevation of the frame of the bell for announcing operation of the machine.

Similar reference characters throughout the various figures of the drawings designate corresponding elements or features of construction.

In a practical embodiment of the invention, a frame is provided which comprises a rim, the greater portion of which is circular and designated by the numeral 1, the rim having a straight portion 2 at the front thereof, and also a straight portion 3 at one side thereof extending approximately at right angles to the straight portion 2, the frame comprising also a suitable number of arms 4 connected to the rim and a center bearing 5 connected to the arms, an abutment 6 formed as a horizontal bar and connected at its ends to the rim of the frame and to the center bearing, the abutment preferably having an inclined top 7. The frame is provided with a post 8 at the rear side thereof. A rotary table 9 is provided with a removable table top 10 on which the cheese is to be supported, and any suitable means may be provided for preventing the cheese from shifting upon the table top after being properly placed thereon. The table proper is preferably circular or disk-shaped and has a central pivot 9' mounted in the bearing 5 of the frame so as to be rotative, the pivot having a central opening in its top to receive a central projection 10' of the table top, the latter having a projection 11 somewhat remote from the center thereof, entering a suitable opening in the table 9 to prevent the table top from shifting with respect to the table proper. A lever 12 is pivoted to the post 8 and supports a cutting knife 13 to operate upon the table top for cutting off portions of the cheese, the cutting knife being adapted to swing upwardly and away from the table top.

The under side of the table 9 is provided with a multiplicity of equidistantly spaced teeth arranged in a plurality of concentric circular series, the different series of teeth comprising different numbers of teeth, all being alike and preferably of the ratchet tooth form, but it is to be understood that any practical equivalent of the teeth may be substituted therefor. One circular series of teeth 14 is arranged near the periphery of the table, and this series may properly contain one hundred and forty teeth, being equal to a cheese, the weight of which is expressed by numerals 35, indicating the total weight of the cheese and multiplied by four as representing quarters of the pound. Another series 15 is arranged inwardly towards the center of the table, and this may properly contain seventy-two teeth for cutting multiple portions of either a nine pound or an eighteen pound cheese. Another series 16 is arranged adjacently and at the outer side of series 15 and this may properly contain seventy-six teeth for dividing a nineteen pound cheese into quarter-pound or larger portions. A suitable number of other series are arranged between the series 14 and the series 16. In the present plan the next series adjacent to 16, contains eighty teeth, the next one eighty-four, the next one eighty-eight, and so on, each succeeding series having four teeth more than the preceding adjoining series. The teeth perform dual functions, being engaged by a controlling device for moving the table periodically to adjust its position positively, and for temporarily locking or holding the table in fixed positions after having been adjusted. The teeth as will be seen, project downwardly with vertical operative faces and inclined backs.

An indicator or scale bar 17 is mounted on the straight portion 2 of the frame horizontally and is provided along the lower portion thereof with a row of counter-sunk holes or sockets 18 corresponding in number to the number of concentric circles of teeth with which the table is provided, and the indicator is provided also with another horizontal row of like holes or sockets 19 arranged in a plane somewhat removed higher from the first-mentioned sockets, there being one-half the number of holes or sockets in this row as there are in the row of holes 18. Adjacent to each hole or socket 18 is a number 20 that corresponds to the weight of cheese, as for instance, an eighteen pound cheese, one weighing nineteen pounds, or one weighing twenty pounds, various other numbers being used, proceeding as high for instance as thirty-five for a cheese of thirty-five pounds weight, these numbers progressing consecutively. Numbers 21 are arranged adjacent to the row of sockets 19, these representing each one-half the value of the other numbers 20 which can be divided evenly by two and may properly be the number nine in the same vertical plane as the number 18, the number 10 in the same plane as the number 20 progressing consecutively, a smaller number agreeing with the minimum size of cheese, and a larger number "17" being one number lower than the lower number "18" in the row of numerals 20. Adjacent to the numerals 20 are figures 22 which represent the total value of the whole cheese at which they are to be retailed by adjusting the machine in conformity to the several positions of the holes or sockets 18 respectively, and adjacent to the row of numerals 21 are figures 23 similarly indicating the total values of the whole cheese in dollars and cents, in the present case the price being based on the value of twenty cents per pound, and therefore a nine pound cheese, as will appear, will be worth one dollar and eighty cents, and may be cut into thirty-six portions of approximately one-fourth pound each or five cent portions or multiples thereof.

finger 55 on the boss 56 of the operating lever 29, so that when the operating lever is depressed the finger will operate the bell hammer, and the knuckle 54 will permit of the return of the finger without disturbing the bell hammer.

It will be understood that the above described mechanism is designed to be a simple and effective construction of the invention in detail, but various equivalents thereof may be fairly made within the scope of the invention, as for instance, it is obvious that the limbs 26 and 26' may be temporarily fixed to the guide bar 24 by various other means than herein described, while at the same time regulating the positions to correspond with the designations on the indicator, and also the register and the bell may be otherwise mounted and operated than as described to attain the desired results.

In practical use it will be understood that the cheese is to be accurately centered upon the cheese table, and if the cheese weighs eighteen pounds the operating lever and the controlling bar will be shifted by means of the shifting and setting frame and the set screw 28 seated in the hole 18 adjacent to the numerals 20 indicating "18" on the indicator, the total value of the cheese being three dollars and sixty cents. The controlling bar 33 will cooperate with the series of teeth 15, there being seventy-two teeth in this series, and at each operation of the lever 29 the table may be moved a distance equal to the space between two teeth and the slices of approximately one-fourth pound weight may be cut to be sold for five cents. If it is desired to cut double the amount the operating lever is to be operated twice in succession before making the cut, and if one pound or twenty cents worth is to be cut the lever will be operated four times in succession before making the cut. In case the cheese weighs nine pounds the set screw 28 would be inserted in one of the holes 19 adjacent to the numeral "9" on the indicator, the total value of the cheese being one dollar and eighty cents, and this would permit the lever 29 to travel its maximum amount at each operation so that the table would be moved with each operation a distance equal to the space of two of the teeth to cut one-fourth pound or five cent portions of the cheese with the controlling bar 33 cooperating with the series of teeth 15.

When the operating lever 29 is moved downward the controlling bar 33 moves the table 9 a predetermined distance and the shoulder 36 engages the abutment 6, the end 34 being held closely between two of the teeth of the table by reason of the wedge-shape of the end 34, with the tapered under side 35 in contact with the top 7 of the abutment, so that when the bar 33 stops suddenly the table is positively prevented by the end 34 from moving farther than the predetermined distance, the result being accurate division of the cheese. The wedge-shape of the end 34 permits the bar 33 to be retracted from the teeth freely without in the least dragging back or retracting the table, as will be seen.

Other adjustments for dividing and cutting cheeses of various other sizes will be readily understood from the foregoing description which also makes clear the results of operation of the register and the alarm bell.

Having thus described the invention, what is claimed as new is—

1. A cheese cutter including a cutting knife, a rotary table to cooperate with the cutting knife and provided with a series of teeth, a movable controlling device to cooperate with the teeth for moving the table rotatively, and means for forcing the controlling device fixedly into engagement with one of the teeth to positively lock the table.

2. A cheese cutter including a cutting-knife, a rotary cheese table to cooperate with the cutting-knife and provided with a circular series of teeth, a movable controlling device to cooperate with the teeth for moving the table rotatively, adjustable means for limiting the movement of the controlling device, and means for temporarily holding the controlling device fixedly in engagement with one of the teeth to lock the table.

3. A cheese cutter including a cutting knife, a rotary cheese table to cooperate with the cutting knife and provided with a series of teeth, a movable controlling device to cooperate with the teeth for moving the table rotatively, an operating lever for the controlling device, an indicator bar having a plurality of rows of sockets, and adjustable means for limiting the movement of the controlling device and provided with a clamp-screw for entering either one of the sockets.

4. A cheese cutter including a cutting-knife, a rotary cheese table to cooperate with the cutting-knife, a controlling device for moving the table rotatively and adjusting the positions thereof, an operating lever for the controlling device, means for limiting the movements of the controlling device to control the extent of movement of the table, a register to indicate the amount of cheese cut off by the cutting-knife, and means actuated by the movements of the operating lever for actuating the register.

5. A cheese cutter including a cutting-knife, a rotary cheese table to cooperate with the cutting-knife, a controlling device for moving the table rotatively and adjusting the positions thereof, an operating lever for the controlling device, means for limiting the movements of the controlling device to control the extent of movement of the table, a bell to announce the movements of the table, The machine frame is provided with a cylindrical guide bar 24 which is attached to the straight portion 3 and to a bracket 25 that is supported by the straight portion 2 of the frame, the guide bar being horizontal and parallel with the front portion of the frame.

A combined shifting and setting frame is mounted adjustably on the guide bar 24 and comprises two main supporting limbs 26 and 26' connected by an integral arm 27 which is provided with a set screw 28 adapted to enter either one of the holes or sockets 18 or 19, the ends of the limbs being mounted on the guide bar, and at the junction of the limbs with the arm 27 the frame has a stop seat 27'. An operating lever 29 provided with a finger piece 30 is mounted rotatively on the guide bar 24 between the limbs 26 and 26', the guide bar serving as a pivot for the lever, the latter being adapted to engage the stop seat 27' in its upward movement to be limited thereby. The operating lever has a fulcrum end having two guide flanges 31 and 31' provided with a pivot 32 on which is mounted a controlling bar 33 which is guided between and by the flanges, the controlling bar extending towards the rear side of the machine under the table 9, and has a pawl-shaped end 34 adapted to fit between two of the teeth, as 15, of the table, the under side 35 being tapered with respect to the upper side of the end to correspond to the inclination of the top 7 of the abutment 6, the controlling bar having a shoulder 36 projecting from its under side to engage the abutment 6, as in Fig. 2 to positively stop and accurately adjust the position of the table 9 after each movement thereof. The operating lever 29 is provided with a socket 37 in which is seated a spring 38 that engages the opposite end of the controlling bar 33 near the pivot 32, the spring having a dual function, being so arranged as to constantly hold the controlling bar 33 up to the teeth of the table, and by reason of this contact serving to raise the operating lever 29 and hold it to its stop seat 27' except when manually operated. It will be observed that the operating lever 29 moves in a vertical plane and projects forwardly from the machine frame so that it may be conveniently operated by those accustomed to operating well known types of cash registers with which merchants have become familiar. It will be seen that the shoulder 36 limits the movements of the lever 29 and consequently the controlling bar 33 in one direction, and the minimum amount of movement is permitted when the screw 28 engages the lower portion of the indicator in any one of the holes 18, and further that the amount of movement is changed to permit of the maximum movements when the shifting and setting frame is adjusted with the screw 28 engaging one of the upper holes 19. The pressure of the screw effectively binds the frame on the guide bar 24 by exerting its force against the indicator bar, thus serving as a clamp. The frame as will be seen may be readily shifted along the guide bar 24 so as to change the position of the controlling bar 33 with respect to the different circles of teeth of the rotary table.

A register 40, which may be variously constructed with indicating disks or wheels 41, having suitable numerals so as to register whole numbers and quarters, halves and three quarters thereof, is attached to an arm 42 which is supported by the limb 26', the register having an operating shaft or spindle 43 on which is secured a ratchet wheel 44, and on which is rotatively mounted a pinion 45 carrying a pawl 46 in engagement with the ratchet wheel, the pinion being in constant engagement with a segmental rack bar 47, which is secured to the operating lever 29, so that when the operating lever is depressed the register will be operated, and when retracted the pinion 45 will rotate without operating the register.

Two registers may be provided, one suitably geared so as to operate properly with the screw 28 in either one of the holes 18, and the other one suitably geared so as to operate properly with the screw in either one of the holes 19, and the registers may be readily exchanged, either one for the other, when setting the machine to suit any given size of cheese, the object of the register being to enable the merchant to ascertain what proportion of the cheese has been cut at any time, and the total when all sold. The register may obviously be designed to register the number of fractional pieces cut from the cheese, or the value of the cheese in dollars and cents, instead of pounds and fractions above mentioned. In some cases the operating devices of the register may be so designed that the amount of movements of the register disks will be the same with either the maximum or the minimum travel of the lever 29.

A suitable bell frame 48 is mounted on the guide bar 24 between the limb 26' and the operating lever 29 so as to be movable therewith along the guide bar but is prevented from rotation by means of a guide arm 49 which engages the straight front portion 2 of the frame of the machine, the bell frame being provided with a stop 50 and supporting a gong-shaped bell 51, a bell hammer arm 52 being pivoted on the bell frame and provided with a spring 53 to throw the hammer arm against the stop 50 when the bell is to be struck, the hammer arm being slightly elastic so that after being stopped suddenly the hammer will strike and rebound from the bell, as will be understood. The hammer arm is provided with a knuckle 54 to be engaged by a and means actuated by the movements of the operating lever for causing the bell to sound.

6. A cheese cutter including a cutting-knife, a rotary cheese table to coöperate with the cutting-knife and provided with a series of teeth, a controlling-bar coöperating with the teeth for moving the table rotatively and adjusting the positions thereof, an operating lever connected with the controlling-bar, means for adjustably limiting the movements of the controlling-bar to change the extent of movement of the table, and means serving to lock the controlling-bar in engagement with a tooth of the table to accurately fix the position of the table after movement thereof.

7. A cheese cutter including a cutting-knife, a rotary cheese table to coöperate with the cutting knife, a controlling device for moving the table rotatively and adjusting the positions thereof, an operating lever for the controlling device, a computed indicator, limiting means adjustably connected to the indicator and adjustably limiting the movements of the operating lever to change the extent of movement of the controlling device in one direction, means for positively stopping the movement of the device in the opposite direction, and means coöperating with the controlling device to positively adjust the positions of the table.

8. A cheese cutter including a cutting-knife, a rotary cheese table to coöperate with the cutting-knife and provided with a multiplicity of equidistantly-spaced teeth arranged in a plurality of concentric circular series, the different series of teeth comprising different numbers of teeth, movable controlling means to coöperate with either one of the series of teeth for moving the table rotatively, a computed indicator, combined shifting and setting mechanism for determining the plane of movement of the controlling device to limit its coöperations with either one of the series of teeth, and means for adjustably fixing the mechanism in relation to the indicator.

9. A cheese cutter including a frame having a horizontal guide-bar, a cheese table mounted rotatively on the frame, an operating lever mounted on the guide-bar pivotally and operating in a vertical plane, a controlling device connected with the operating lever and coöperating with the table for movement and adjustment thereof, a computed indicator mounted on the frame, means for adjustably limiting the extent of movements of the operating lever in accordance with designations of the indicator, and a cutting-knife mounted on the frame to coöperate with the table.

10. A cheese cutter including a frame having a horizontal cylindrical guide-bar, a cheese table mounted rotatively on the frame, a computed indicator mounted on the frame parallel to the guide bar, a combined shifting and setting frame mounted rotatively and slidingly on the guide-bar and provided with a stop-seat, an operating lever mounted rotatively on the guide-bar to engage the stop-seat and guided against lateral movements by the shifting and setting frame, a controlling device connected with the operating lever and coöperating with the table for movement and adjustment thereof, means for adjustably securing the shifting and setting frame fixedly to the guide-bar in accordance with designations of the indicator, and a cutting-knife mounted on the frame to coöperate with the table.

11. A cheese cutter including a frame having a horizontal guide bar, a cheese table mounted rotatively on the frame, a combined shifting and setting frame mounted rotatively and slidingly on the guide bar and provided with a stop-seat, an operating lever mounted rotatively on the guide-bar to engage the stop-seat and guided against lateral movement by the shifting and setting frame, a controlling device connected with the operating lever and coöperating with the table for movement and adjustment thereof, means for adjustably securing the shifting and setting frame fixedly to the guide-bar, a cutting-knife mounted on the frame to coöperate with the table, a bell-frame mounted slidingly on the guide bar and having a bell mounted thereon, a bell-hammer arm mounted on the bell-frame, and a finger carried by the operating lever to trip the bell-hammer arm.

12. A cheese cutter including a frame having a horizontal guide-bar, a cheese table mounted rotatively on the frame, a combined shifting and setting frame mounted rotatively on the guide bar and provided with a stop-seat, an operating lever mounted rotatively on the guide-bar to engage the stop-seat and guided against lateral movement by the shifting and setting frame, a controlling device connected with the operating lever and coöperating with the table for movement and adjustment thereof, means for adjustably securing the shifting and setting frame fixedly to the guide-bar, a cutting knife mounted on the frame to coöperate with the table, a register mounted on the shifting and setting frame, and a device mounted on the operating lever for actuating the register.

13. In a computing cheese cutter, the combination with a frame, a cutting knife mounted on the frame, and a cheese table rotatively mounted on the frame, of an operating lever mounted pivotally and adjustably on the frame and limitable to a predetermined extent of movement, means for limiting the extent of movement of the operating lever, computing means for imparting to the table different numbers of intermittent movements per revolution of the table with a constant extent of movement of the operating lever, and means for adjusting the operating lever to different positions to be subject to requirements for coöperating with the computing means.

14. In a computing cheese cutter, the combination with a cutting-knife, of a frame supporting the cutting-knife and provided with a horizontal abutment, a cheese table mounted rotatively on the frame over the abutment and provided on the under side thereof with a plurality of series of teeth arranged serially in concentric circles, a controlling device mounted on the frame and adjustable to operate with either one of the series of teeth, the controlling device having a pawl-shaped end for engaging the teeth and also the abutment, and means for actuating the controlling device to forcibly hold the end thereof in engagement with the abutment and a tooth of the table.

15. In a computing cheese cutter, the combination with a frame, a cutting-knife mounted on the frame, and a cheese table rotatively mounted on the frame, of an adjustable operating lever mounted pivotally on the frame and limitable to different predetermined extents of movement, means for adjustably limiting the extent of movement of the operating lever, computing means between the operating lever and the table for imparting to the table different numbers of intermittent movements per revolution with a constant extent of movement of the operating lever, and means for adjusting the operating lever to different positions to be subject to requirements for coöperating with the computing means.

16. In a computing cheese cutter, the combination with a frame, a cheese table mounted rotatively on the frame, and a cutting-knife mounted on the frame, of an indicator mounted on the frame and having sockets therein and also numerals adjacent thereto designating weights and values of cheeses, a guide-bar mounted on the frame parallel to the indicator, a shifting and setting frame and also an operating lever mounted adjustably on the guide-bar, the operating lever being guided by the frame, and a set screw mounted on the shifting and setting frame to enter either one of the sockets of the indicator for setting the operating lever in accordance with the indicator, and means between the operating lever and the table for moving and adjusting the table rotatively.

In testimony whereof, I affix my signature in presence of two witnesses, on the 1" day of July 1907.

JOHN WINKELMEYER.

Witnesses:
   Thos. Bagot,
   Chas. R. Bagot.